UNITED STATES PATENT OFFICE.

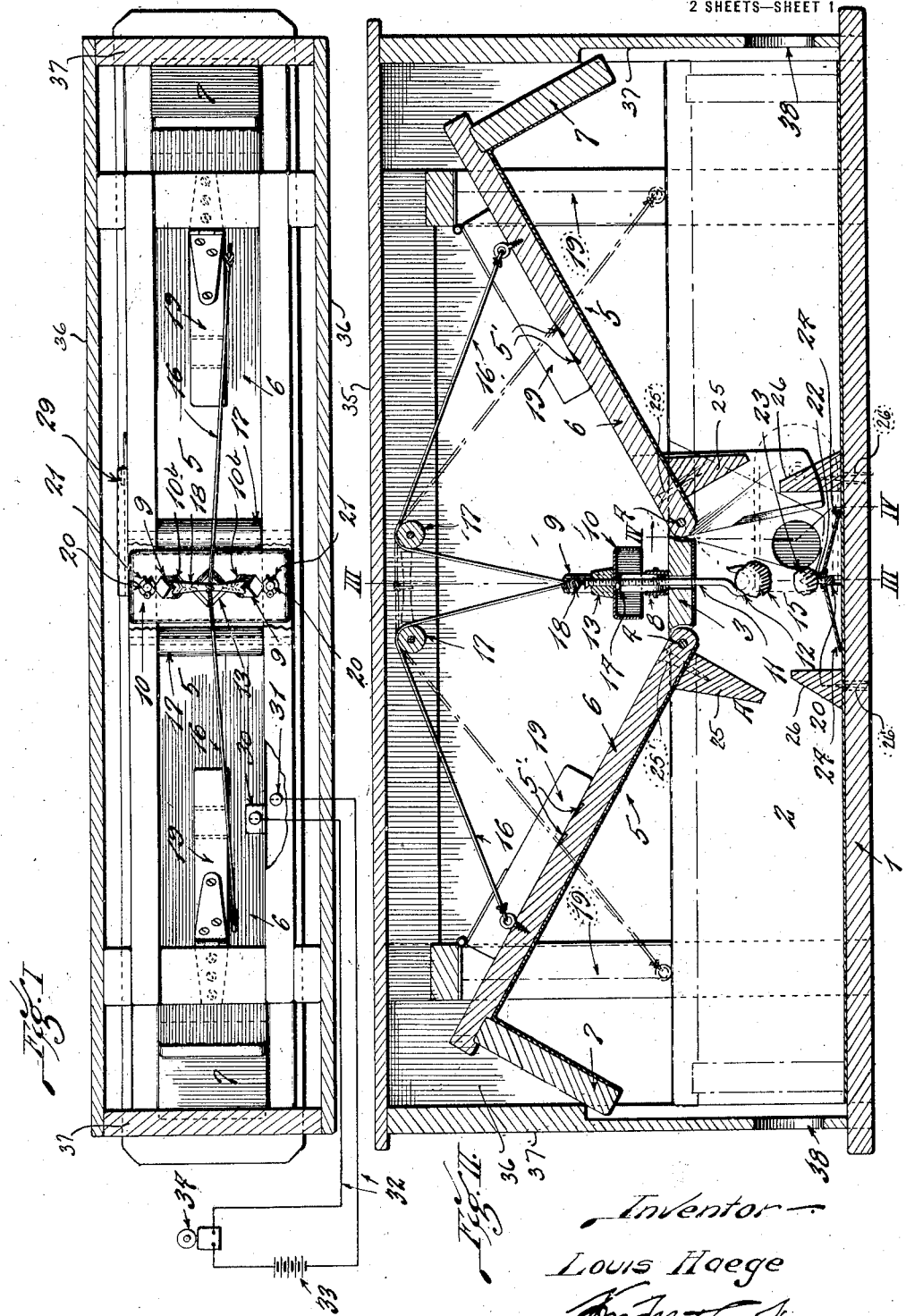

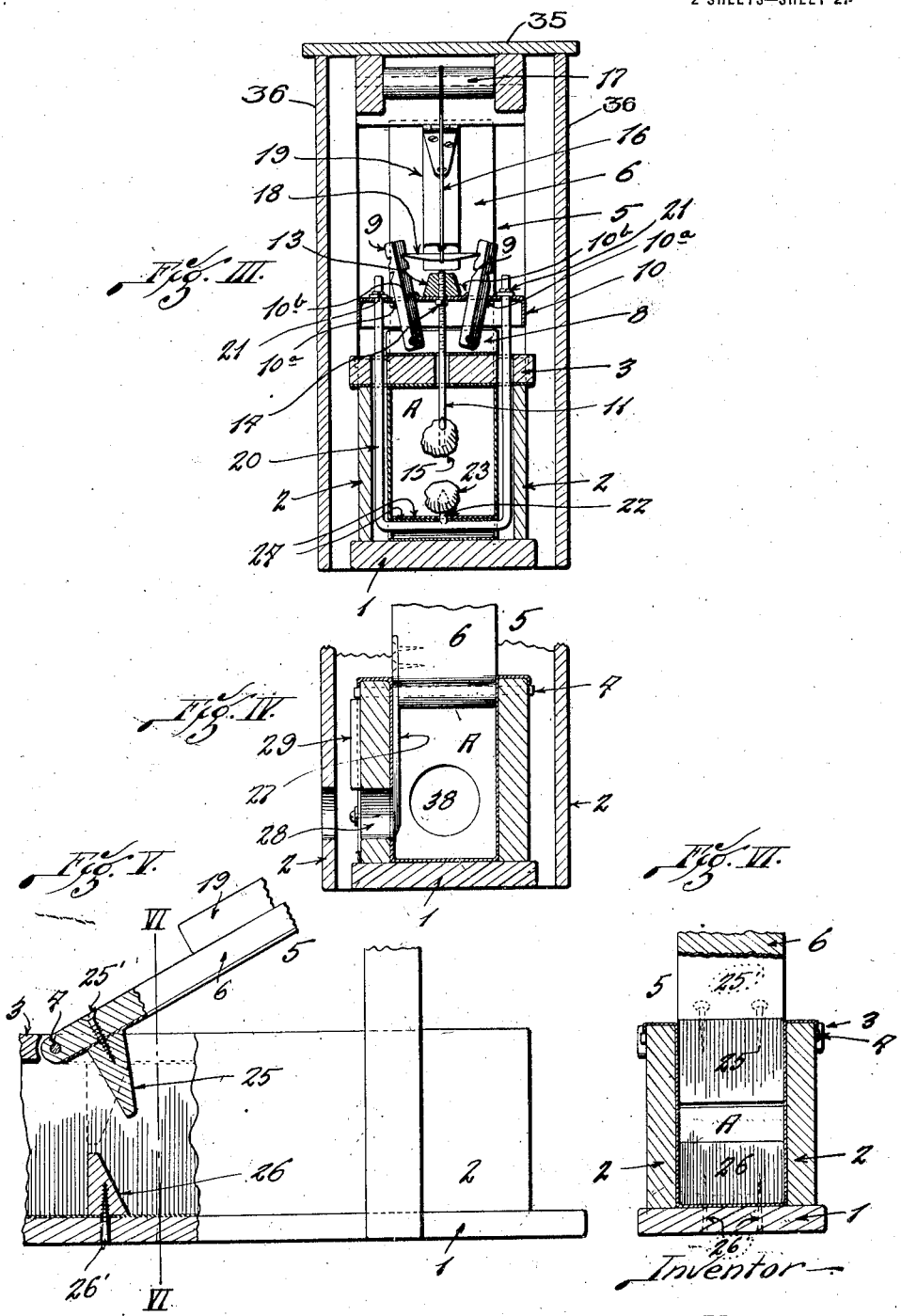

LOUIS HAEGE, OF NEW MEMPHIS, ILLINOIS.

ANIMAL-TRAP.

1,355,831.

Specification of Letters Patent.  Patented Oct. 19, 1920.

Application filed September 13, 1919.  Serial No. 323,601.

*To all whom it may concern:*

Be it known that I, LOUIS HAEGE, a citizen of the United States of America, a resident of New Memphis, in the county of Clinton, State of Illinois, have invented certain new and useful Improvements in Animal-Traps, of which the following is a full, clear, and exact description, reference being had to the accompanying drawings, forming a part of this specification.

My invention relates to animal traps, and has for one of its objects the construction of a simple and inexpensive device for trapping fur-bearing animals, rabbits, mice or rats.

Briefly stated, this trap is one having trap-doors which are released from a locked open position by the operation of certain mechanism. The operation of this mechanism is caused by the animal nibbling at the bait or stepping upon a false bottom, thereby releasing the trap-doors and imprisoning the animal within the trap. Another object is to construct a device which can be used as a live trap, or, with a slight addition of parts, can be converted into a "dead fall" trap.

With the foregoing and other objects in view, the invention comprises the novel construction, combination and arrangement of parts hereinafter more specifically described and illustrated in the accompanying drawings, wherein is shown the preferred embodiment of the invention; however, it is to be understood that the invention comprehends changes, variations and modifications which come within the scope of the claims hereunto appended.

Figure I is a top view of my trap with the housing shown in section.

Fig. II is a longitudinal section.

Fig. III is a section on the line III—III, Fig. II.

Fig. IV is a section on the line IV—IV, Fig. II.

Fig. V is a fragmentary elevation, partly in section, showing the removable "dead fall" members.

Fig. VI is a section on the line VI—VI, Fig. V.

In the drawings, A indicates a compartment in which the animals caught by my trap are imprisoned, this compartment having a floor 1 and side walls 2. Extending across the compartment A from one side wall to the other, and fixed thereto, is a stationary top member 3. Hinged at points indicated by 4 are trap-doors 5, comprising top members 6 and end members 7. It will be noted that the floor, side walls, trap-doors and stationary top members have their inside faces lined with galvanized iron or any other suitable material; thus, when the trap-doors are down, a metal lined compartment is provided, from which it is impossible for an animal to gnaw its way. It is to be understood, however, that these elements may be made of any other suitable material. Fixed to the stationary top member 3 is a hinge plate 8. This plate is U-shaped in cross section and has pivotally mounted between its upturned sides trip fingers 9, having notches 9'. A locking element 18 (Fig. III), which will be hereinafter described, extends from one tripping finger to the other and its ends are adapted to enter the notches formed at opposite sides of each tripping finger 9, as shown in Fig. III so when the notches at one side become worn, the tripping fingers can be removed and reversed to expose the other notches to the locking element 18. It will be observed that the tripping fingers 9 are inclined, and that they are arranged at an angle to each other.

Loosely mounted and arranged to slide vertically upon the trip fingers 9, is a spreader 10 which is preferably made of galvanized iron and has openings $10^a$, through which the trip fingers 9 extend. The inner ends of these openings are pointed to conform to the shape of the fingers 9 and have upturned flanges $10^b$, which bear against the said fingers, as is shown very clearly in Fig. I of the drawings.

Passing through an opening in the spreader 10 is a rod 11, the upper end of which is screwthreaded and the lower end of which terminates in a hook 12. This rod is fastened rigidly to the spreader by means of a nut 13 and lock-nut 14, and is threaded for considerable distance from the top. This is so arranged that it will be possible to adjust the bait 15, which is carried on the hook 12, it being obvious that in trapping different animals it would be desirable to have the bait placed at different elevations. Fastened to each of the trap-doors 5 are cords 16, which pass over rollers 17 and have attached to their free ends a locking pin 18. This locking pin 18 is adapted to be received by the notches 9' in the trip fingers 9.

Hinged to a frame-work supported by the side walls 2 are gravity pawls or locking blocks 19, whose free ends rest upon the trap-doors 5 and are adapted to enter notches 5', cut in the surface of the top member 6, when the trap-door is moved. The notches 5' provide ratchet teeth adapted to coöperate with the pawls or locking blocks 19. The purpose of this arrangement is to prevent an animal with a long body from backing out of the trap or lifting the trap-doors, after having once sprung the trap. Even if the animal is of such length that its body extends beyond the end of the compartment A, the end member 7 of the trap-door 5 will strike against the back of the animal when the trap is sprung, and the free ends of the locking blocks will enter one of the notches 5', making it impossible for the animal to raise the trap-door enough to free itself, thus trapping the animal just as effectively as if the trap-door had closed behind it.

Passing through openings in the spreader 10 is a U-shaped rod 20. This rod is fastened to the spreader by means of cotter pins 21 and has formed on its lower horizontal leg a pointed extension 22 adapted to receive a bait 23. Inclined tripping plates 24, having one end resting upon the floor 1 and the other end resting upon the lower leg of the U-shaped rod 20, form a false bottom. These plates are perforated and the bait carrying extension 22 heretofore mentioned passes through these openings.

The operation of my trap is as follows:

The locking pin 18 attached to the cords 16 is drawn down and its ends inserted in the notches 9' of the trip fingers 9. This, because of the fact that the other ends of the cords 16 are attached to the trap-doors 5 will raise the said trap-doors and hold them in an elevated position. The slightest nibble at either of the baits will cause the spreader 10 to move, and because the flanges 10ᵇ are pressing hard against the fingers 9 at all times, movement will be imparted to the said fingers, forcing the trip fingers apart and freeing the locking pin from the notches, thus allowing the trap doors to drop down, trapping whatever happens to be in the trap. It will be noted that it is not necessary for the spreader to be pulled straight down to cause the trap to be sprung; a lateral movement in any direction would be just as effective, as it is only necessary for one of the trip fingers to be moved to free the pin 18. My trap can be operated through the medium of the U-shaped rod 20, either by the animal nibbling at the bait 23 or stepping upon the inclined plates 24, as the weight of the animal on the plates will draw the rod 20 downwardly, spreading the fingers 9 and releasing the trap.

When the trap-doors are down they are held in a locked position by means of the hinged locking blocks 19, which swing into a vertical position between the trap-doors and the upper frame member to which they are hinged, making it impossible to raise the trap-doors from inside the compartment A.

Attention is called to the locking pin 18 which is double faced, having a horizontal face and an inclined one. For ordinary trapping, the horizontal face would be used, but should an extremely sensitive tripping mechanism be desired for certain animals, the pin is reversed and the inclined face used.

For the purpose of using my trap as a dead-fall trap, I provide blocks 25 (Fig. V) which are rigidly fixed to the trap-doors 5 and blocks 26, which are placed on the floor 1. These dead fall members 25 and 26 are detachably held in place by means of screws 25' and 26'. It will be seen by referring to Fig. V of the drawings that an animal springing the trap in attempting to obtain the bait will have its neck in a position between the blocks 25 and 26, and will be killed by the block 25 striking it. An animal caught by the dead-fall blocks will be confined by the closed trap doors and cannot be reached by a dog or other animal at the exterior of the trap. I have also provided a means for killing small animals such as mice and rats. A blade 27, secured to one of the trap-doors 5, is adapted to swing across an opening 28 formed in one of the side walls 2. Any animal inserting its head through the opening 28 and nibbling at the bait will spring the trap. The blade being carried by one of the trap-doors will swing across the opening 28, severing the head of the animal. A hinged cover 29 is provided to close the opening 28 when the trap is being used as a live trap.

Fixed to one of the trap-doors is an electric contact 30 (Fig. I), which, when the trap-door is down, contacts with the metal lining of the compartment A, thereby completing a circuit including a binding post 31 electrically connected to the metal lining, and conductors 32 whereby contact 30 and binding post 31 are connected to a battery 33 and a bell 34.

A cover consisting of a top wall 35, side walls 36 and end walls 37 is adapted to inclose the sides, ends and top of the trap. This cover has no bottom and it can be very easily lifted and removed from the trap to expose the trap-doors and the tripping elements. One of the objects in covering the trap is to prevent the tripping elements from being affected by snow or ice, and another object is to prevent dogs or other animals from actuating the tripping elements which lie over the trap. The removable cover is provided with openings 38 registering with the inlets at the ends of the trap, and one side wall of the cover is provided with an opening 39 registering with the opening 28 in the side of the trap.

I claim:

1. An animal trap having a trap-door, pivotally mounted trip members movable toward and away from each other, a locking element spanning said trip members and detachably interlocked therewith, door-holding means coöperating with said locking element to hold the trap-door in its open position, and a tripping device whereby said trip members are shifted to release said locking element.

2. An animal trap having a trap-door, pivotally mounted trip members movable toward and away from each other, a locking element spanning said trip members and detachably interlocked therewith, door-holding means coöperating with said locking element to hold the trap door in its open position, and a tripping device comprising a spreader interposed between said trip members, said spreader being movable to force the trip members away from said locking element.

3. An animal trap having a trap-door, pivotally mounted trip fingers arranged at an angle to each other, a locking element spanning said trip fingers and detachably interlocked therewith, said trip fingers being movable toward each other to receive the locking element and movable away from each other to release the same, door-holding means coöperating with said locking element to hold the trap door in its open position, and a tripping device comprising a spreader whereby said trip fingers are forced away from each other.

4. An animal trap having a trap-door, pivotally mounted trip fingers arranged at an angle to each other, a locking element spanning said trip fingers and detachably interlocked therewith, said trip fingers being movable toward each other to receive the locking element and movable away from each other to release the same, door-holding means coöperating with said locking element to hold the trap door in its open position, and a tripping device comprising a spreader interposed between and engaging said trip fingers, and a bait holder secured to said spreader.

5. An animal trap comprising a housing provided at its ends with trap-doors, pivotally mounted trip fingers arranged over said housing, the opposing faces of said trip fingers being provided with notches, a locking element spanning said trip fingers and having its ends removably mounted in said notches, said trip fingers being movable toward each other to receive said locking element and movable away from each other to release the same, flexible means connecting said locking element to said trap-doors so as to hold the latter in their open positions, a spreader block interposed between and engaging said trip fingers, said spreader block being movable to force the trip fingers away from each other, thereby releasing the locking element, and a bait holder secured to said spreader block and extending into said housing.

6. An animal trap comprising a housing provided with a trap-door, pivotally mounted trip members movable toward and away from each other, a locking element spanning said trip members and detachably interlocked therewith, door-holding means coöperating with said locking element to hold the trap-door in its open position, and a tripping device comprising a spreader whereby said trip members are shifted to release said locking element, a bait holder extending from said spreader and into said housing, and adjustable means whereby said bait holder is secured to said spreader.

7. An animal trap comprising a housing provided with a trap-door, pivotally mounted trip members movable toward and away from each other, a locking element spanning said trip members and detachably interlocked therewith, door-holding means coöperating with said locking element to hold the trap-door in its open position, and a tripping device comprising a spreader whereby said trip members are shifted to release said locking element, said spreader being above said housing, a bait holder extending from said spreader and into said housing, and screw threaded members whereby said bait holder is adjustably secured to said spreader.

8. An animal trap comprising a housing provided with a trap-door, pivotally mounted trip members movable toward and away from each other, a locking element spanning said trip members and detachably interlocked therewith, door-holding means coöperating with said locking element to hold the trap-door in its open position, and a tripping device comprising a spreader whereby said trip members are shifted to release said locking element, a spreader actuating device extending from said spreader and into said housing, and a yielding floor plate arranged in said housing and engaging said spreader actuating device to provide for the transmission of movement to said spreader.

9. An animal trap comprising a housing provided with a trap door, pivotally mounted trip members movable toward and away from each other, a locking element spanning said trip members and detachably interlocked therewith, door-holding means cooperating with said locking element to hold the trap-door in its open position, and a tripping device comprising a spreader whereby said members are shifted to release said locking element, a spreader actuating yoke extending from said spreader, a portion of said yoke being located across the bottom of said housing, and yielding floor plates extending over said portion of the yoke to provide for the transmission of movement to said spreader.

10. An animal trap comprising a housing provided with a trap-door, a pair of pivotally mounted trip fingers movable toward and away from each other, opposite sides of each trip finger being provided with notches, a locking element spanning said trip fingers and extending into notches therein, each of said trip fingers being reversible so that either of its notched sides may be arranged to receive said locking element, door-holding means coöperating with said locking element to hold the trap-door in its open position, and a tripping device whereby said trip fingers are actuated to release said locking element.

11. An animal trap comprising a housing, a trap-door pivoted to said housing, a tripping device whereby said trap-door is held in its open position, one of the side walls of said housing being provided with an opening forming an entrance to the housing, and a blade secured to said trap-door and arranged at said side wall to form a closure for said opening when the trap-door occupies its closed position.

12. An animal trap comprising a housing, a trap-door pivoted to said housing, a tripping device whereby said trap-door is held in its open position, one of the side walls of said housing being provided with an opening forming an entrance to the housing, a blade secured to said trap-door and arranged at said side wall to form a closure for said opening when the trap-door occupies its closed position, and a door at the exterior of said housing adapted to close said entrance.

13. An animal trap comprising a housing, a trap-door pivoted to said housing, a tripping device whereby said trap-door is held in its open position, and a dead-fall member secured to said trap-door.

14. An animal trap comprising a housing, a trap-door pivoted to said housing, a tripping device whereby said trap-door is held in its open position, an upper dead-fall member removably secured to said trap-door, and a lower dead-fall member removably secured to the bottom of said housing, said dead-fall members being located adjacent to each other so as to coöperate with each other when the trap-door moves to its closed position.

In testimony that I claim the foregoing I hereunto affix my signature.

LOUIS HAEGE.